(12) United States Patent
Bromley et al.

(10) Patent No.: US 7,523,083 B2
(45) Date of Patent: *Apr. 21, 2009

(54) LOCATION-BASED EXECUTION OF SOFTWARE/HMI

(75) Inventors: Clifton Harold Bromley, New Westminster (CA); Shafin A. Virji, Vancouver (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/678,916

(22) Filed: Feb. 26, 2007

(65) Prior Publication Data
US 2007/0135947 A1 Jun. 14, 2007

Related U.S. Application Data

(63) Continuation of application No. 10/671,912, filed on Sep. 25, 2003, now Pat. No. 7,194,446.

(51) Int. Cl.
*G06N 5/00* (2006.01)
(52) U.S. Cl. .............................. 706/45; 706/12; 706/14
(58) Field of Classification Search .................... 710/15
See application file for complete search history.

(56) References Cited

U.S. PATENT DOCUMENTS

| 6,477,435 | B1 | 11/2002 | Ryan et al. |
| 6,559,773 | B1 | 5/2003 | Berry |
| 6,684,164 | B1 | 1/2004 | Chen et al. |
| 6,684,264 | B1 * | 1/2004 | Choi ........................... 710/15 |
| 2003/0097189 | A1 * | 5/2003 | Melzer ........................ 700/17 |
| 2003/0144746 | A1 * | 7/2003 | Hsiung et al. ................. 700/28 |
| 2004/0117624 | A1 * | 6/2004 | Brandt et al. ............... 713/166 |
| 2004/0133853 | A1 * | 7/2004 | Poerner et al. .............. 715/514 |
| 2004/0215657 | A1 * | 10/2004 | Drucker et al. ........... 707/104.1 |
| 2005/0131660 | A1 * | 6/2005 | Yadegar et al. ................. 703/2 |

OTHER PUBLICATIONS

Firish Venkataramani, Walid Najjar, Fadi Kurdahi, Nader Bagherzadeh, Wim Bohm and Jeff Hammes, "Automatic Compilation to a Course-Grained Reconfigurable System-OPN-Chip", 2003, 129 pages.
Hani Naguib and George Coulouris, "Towards Automatically Configurable Multimedia Applications", 2001, 4 pages.
Santosh G. Abraham and Scott A. Mahlke, "Automatic and Efficient Evaluation of Memory Hierarachies for Embedded Systems", 1999, 11 pages.

* cited by examiner

*Primary Examiner*—Joseph P Hirl
(74) *Attorney, Agent, or Firm*—Amin Turocy & Calvin LLP; William R. Walbrun

(57) ABSTRACT

A system and/or method that configures a HMI based at least upon a current state of parameters and a predefined protocol. A processing component queries an industrial automation environment receiving a current state of parameters relating to a human machine interface (HMI). A rendering component automatically configures the HMI to function in accordance with a predefined protocol.

20 Claims, 13 Drawing Sheets

LOCATION-BASED EXECUTION OF SOFTWARE/HMI

CROSS REFERENCE TO RELATED APPLICATIONS

This application is a continuation of U.S. patent application Ser. No. 10/671,912, filed on Sep. 25, 2003 U.S. Pat. No. 7,194,446, entitled "LOCATION-BASED EXECUTION OF SOFTWARE/HMI", the entirety of which is incorporated herein by reference.

TECHNICAL FIELD

The present invention relates generally to industrial control systems, and more particularly to a system and methodology to facilitate rendering of data in an industrial automation environment.

BACKGROUND OF THE INVENTION

Industrial control systems have enabled modem factories to become partially or completely automated in many circumstances. These systems generally include a plurality of Input and Output (I/O) modules that interface at a device level to switches, contactors, relays and solenoids along with analog control to provide more complex functions such as Proportional, Integral and Derivative (PID) control. Communications have also been integrated within the systems, whereby many industrial controllers can communicate via network technologies such as Ethernet, ControlNet, DeviceNet, FOUNDATION Fieldbus, PROFIBUS or other network protocols and also communicate to higher level computing systems. Generally, industrial controllers utilize the aforementioned technologies along with other technology to control, cooperate and communicate across multiple and diverse applications.

Imperative to an automated industrial control system are Human Machine Interfaces (HMI), which enable a human plant operator to control and/or manipulate plant equipment operations and/or functions by means of a computer. A HMI is an application that facilitates creation of custom screens for displaying information and/or controlling an industrial environment, and further provides graphical objects that represent component(s), conditions, equipment, states, etc. which exist in an industrial automation environment. Such graphical representations possess embedded controls enabling a user to make real world changes via modifying computer graphical representations. For example, in an industrial setting, a plant operator can control starting and/or stopping of a pump utilizing a HMI via depressing a key on a keyboard. The capabilities of a HMI include: controlling of industrial systems via displays on a touch screen, graphically representing components utilizing symbols or object libraries, real time trending (e.g., graphically monitoring current system status), data logging, and alarming. HMIs function to allow an operator to monitor machine operation and instantly adjust system controls. Easy and immediate operator response can be facilitated by displaying diagnostic and error messages. Conditions monitored via real time trending can include voltage profiles, current flow, power consumption, on/off state of breakers and disconnects, on/off state of equipment, status of protective relays, power quality, etc.

Conventional HMIs comprise a plurality of deficiencies. High costs are associated with programming and creating custom scripts for HMIs. New applications may not be compatible with existing automation industry environments, and therefore costly and inefficient reprogramming of applications must be implemented to create compatibility. Rendering of a HMI requires programming to configure the HMI to existing hardware components, and reprogramming is necessary when the hardware components are replaced and/or modified.

Configuring a HMI depends on numerous factors. For example, programmers must configure effective HMIs based on user identity, HMI location, equipment employed, type of network, etc. For each of the foregoing parameters, costly programming is necessary to render proper HMIs. Additionally, upon alteration of any parameter, reprogramming can be necessary to effectuate appropriate adjustments to render a proper HMI. In view of the above shortcomings, there is a strong need for computer implemented software capable of rendering a HMI based on current parameters in an industrial automation environment.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for systems and methods facilitating automatic configuration of a HMI based upon a variety of parameters associated with an industrial automation environment, such as type of equipment being employed, equipment being monitored, user proximity to the zone, hierarchy of users within the zone, context of the operating environment, network conditions (e.g., wireless, Ethernet, . . . ), security, security levels, authentication, priorities associated with various potential user actions, etc. The invention also contemplates a variety of hardware components (e.g., tablet PCs, PDAs, telephone, data acquisition devices such as PLCs and "soft" PLCs, . . . ) utilized in conjunction with configuring the HMI to provide for meaningful rendering of applications/data. Moreover, the rate and type of data being pushed can be regulated as a function of the aforementioned analysis. The invention, for example, will render a HMI based upon an interrelation between identified parameters and a predefined protocol, thereby overcoming deficiencies of conventional systems and/or methods which require expensive and inefficient HMI programming as well as reprogramming to render the correct HMI.

In accordance with one aspect of the present invention, a predefined protocol is based upon the zone of operation, user, and extrinsic data. A processing component can be employed to determine a current state of parameters in an industrial automation environment. A rendering component can be provided to automatically configure a HMI in accordance with the predefined protocol and the identified parameters.

In another aspect, the present invention can employ various artificial intelligence schemes (e.g., Bayesian learning methods that perform analysis over alternative dependent structures and apply a score, Bayesian classifiers and other statistical classifiers, including decision tree learning methods, support vector machines, linear and non-linear regression and/or neural network representation) to perform a probabilistic analysis as the type of HMI that should be rendered given the cost of rendering an incorrect HMI. Classifiers could be used for example that are trained explicitly as well as implicitly so as to over time provide for consistent and reliable HMI rendering.

In accordance with another aspect of the present invention, a data store is employed to facilitate HMI rendering. The data store contains parameter interrogation queries and/or parameters relevant to an industrial automation environment. Furthermore, the data store can utilize artificial intelligent techniques (e.g., Bayesian learning methods that perform analysis over alternative dependent structures and apply a score, Bayesian classifiers and other statistical classifiers, including decision tree learning methods, support vector machines, linear and non-linear regression and/or neural network representation) to facilitate storage and retrieval of parameters and/or parameter interrogation queries. Utilizing the resultant data, a HMI is rendered.

In accordance with another aspect of the present invention, a history component is employed to facilitate rendering of a HMI. The history component provides for keeping record of activity within the present invention. For example, the history component can store previous HMI configurations corresponding to parameters in an industrial automation environment and configure a similar HMI when equivalent current parameters exist.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
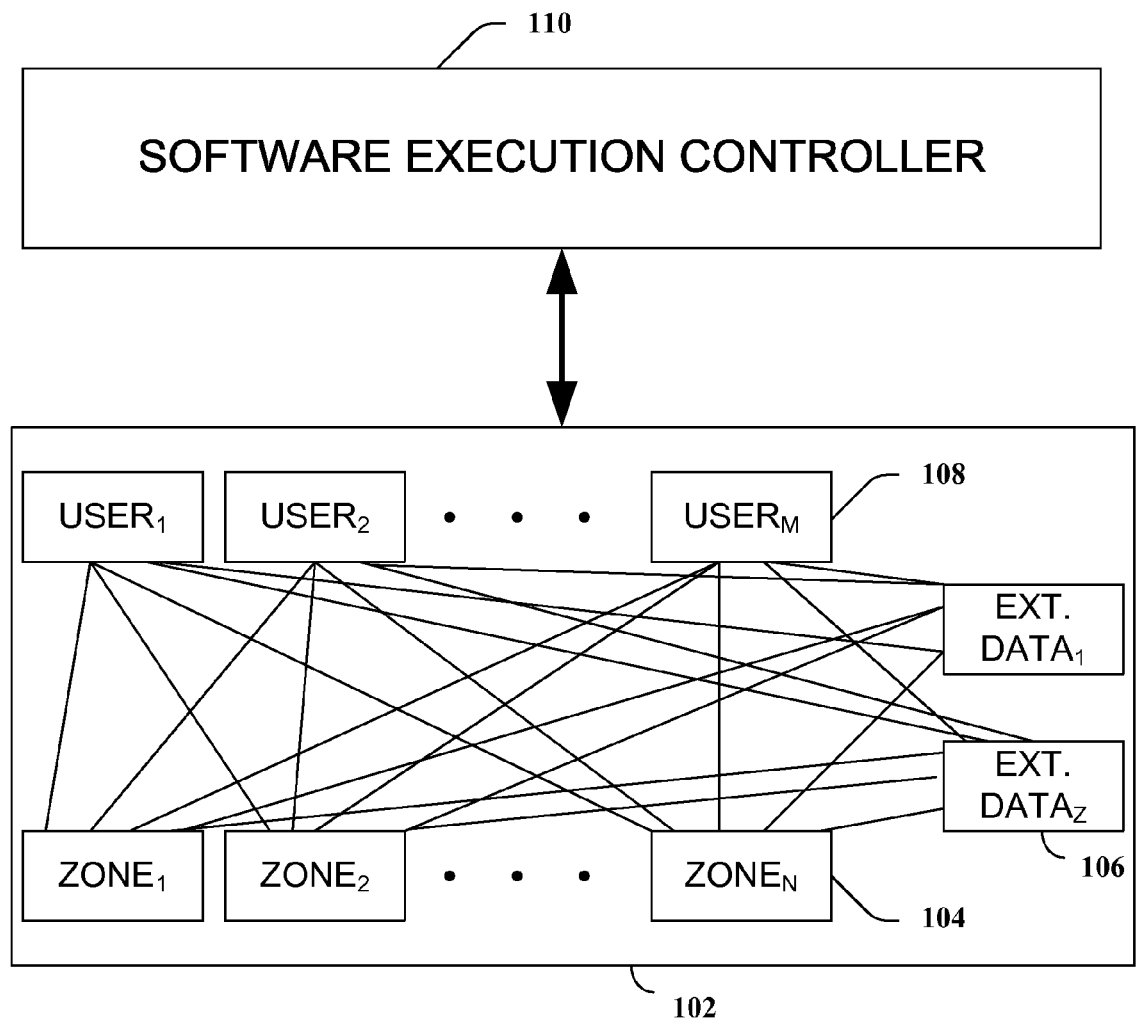
FIG. 1 is an illustration of a block diagram for location-based execution of software/HMI in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It should be understood that the description of these exemplary aspects are merely illustrative and that they should not be taken in a limiting sense.

The term "component" refers to a computer-related entity, either hardware, a combination of hardware and software, software, or software in execution. For example, a component may be a process running on a processor, a processor, an object, an executable, a thread of execution, a program and a computer. By way of illustration, both an application running on a server and the server can be components. A component may reside in one physical location (e.g., in one computer) and/or may be distributed between two or more cooperating locations (e.g., parallel processing computer, computer network).

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks) may be employed.

Referring now to the drawings, FIG. 1 illustrates a high-level system overview in connection with one particular aspect of the subject invention. The subject invention relates to a novel system 100 for automatically configuring a Human Machine Interface (HMI) based at least in part upon a variety of parameters associated with an industrial automation environment. System 100 mitigates deficiencies of conventional systems by enabling effective rendering of a HMI without requiring expert programming skills to configure the HMI.

HMIs are software packages utilized to monitor machine operation and facilitate instantaneous adjustment of system controls. HMIs contain visual representations of particular machine components and/or particular process actions. For example, a HMI representing actions relating to a pump can be a graphical rendering of a pump. HMIs can include but are not limited to graphical depictions of machine components and/or functional descriptions of a methodology. For example, an image of a valve as well as a functional block describing actions desirably taken by a valve can both be incorporated into a HMI in accordance with an aspect of the present invention.

According to an aspect of the present invention, a system 100 employs a software execution controller (SEC) 110 to facilitate identification of extant parameters in order to select a most correct predefined protocol for automatically configuring and rendering a HMI to a user. For example, the invention contemplates zone of operation 104, extrinsic data 106, and user identity 108 as minimum identifiable parameters 102 for determining a most correct protocol for rendering a HMI. Zone of operation 104 can also be employed as a parameter for selecting a most correct protocol. For instance, multiple zones of operation 104 can be defined within an industrial automation environment and a most correct protocol can be determined based upon the location of a SEC 110. Incorporation of zone of operation data as a parameter is advantageous to facilitate providing relevant information to a user who is within a zone of operation 104 and thus, within close proximity of a physical object represented by a HMI.

Furthermore, the SEC 110 can utilize extrinsic data 106 as a parameter for determining a most correct protocol for rendering a HMI to the user. Extrinsic data 106 coupled with known intrinsic data can be utilized to determine which information to render to a user based on a plurality of factors such as user level, access level, etc. Intrinsic data relates to internal processes that occur after a user has entered any input into a system. The software has internal mechanisms that facilitate providing results based on user input. Specifically, if a user logs on and inputs individualized access information, the software will use a series of iterations (intrinsic data) to produce an output used to provide a filter for data acquisition by the user.

Interaction of the extrinsic and intrinsic data sets can facilitate data output to the user to have specific characteristics assigned by the user. Security levels may include, for example, a plurality of options associated with manipulation of data. For instance, a security level can prevent certain data from appearing in a HMI display. However, another security level can display the data to a user but not allow changes to the data representing equipment utilized. Therefore, numerous configurations exist for access levels in terms of how a user can interact with the HMI and/or the data associated with the HMI.

Additionally, SEC 110 can utilize user identity 108 as a parameter for determining a most correct protocol for rendering a HMI to a user. User identity can be based on characteristics of a user 108 such as name, rank, identification number, etc. Depending on the user 108, the SEC 110 can make a partial determination regarding a most correct protocol for rendering a HMI to that user.

The system 100 contemplates numerous other parameters for determining HMI content for a user. For example, type of equipment presently employed can be evaluated in determining a protocol for HMI configuration. Typical hardware components might include PCs, industrial PCs, handheld PCs, tablet PCs, PDAs, telephones, data acquisition devices, etc. Dependent upon type of hardware employed, a most correct protocol can be determined to provide meaningful rendering of applications and data. Various hardware components possess divergent inherent characteristics (e.g., memory limitations, RAM, screen resolution, processor capabilities, operating systems, screen size, peripherals, video capabilities, . . . ); thus, appropriately formatted data must be provided to the hardware components to render useful and meaningful HMIs.

Illustrating distinctions between devices, selection of a most correct HMI rendering protocol can depend on device memory and processing capability. Available memory for a desktop computer is defined by hard drive size and RAM. For example, desktop PCs can possess 50 gigabytes of hard drive storage and 512 megabytes of RAM compared to a handheld PC, which can comprise 32 megabytes of storage and 64 megabytes of RAM. Memory restrictions can limit the amount of data that can be processed while executing a HMI. Additionally, handheld PCs, PDAs and telephones possess lesser processing capabilities than desktop PCs. For example, desktop PCs can utilize 2 gigahertz processors, compared to 400 megahertz processors that can be employed for handheld PCs.

Screen size, resolution, and color capabilities differ between devices and thus according to one aspect of the present invention, can factor into selection of a most correct HMI rendering protocol. For example, desktop PCs can have 21 inch monitors while handheld PCs can possess 3.8 inch screens and cell phones can comprise 2.1 inch LCD displays. Therefore, component sizes are smaller on handheld PCs and cell phones compared to desktop PCs. Screen resolution can also be more restrictive for handheld PCs, PDAs and telephones. For example, desktop PCs can utilize 1024×768 pixel resolutions while handheld PC's resolutions can comprise 240×320 pixels and cell phone's resolutions can comprise 150×150 pixels. Additionally, available colors can differ depending on device type. For example, PDAs can display 16 bit depth and 64,000 colors compared to 64 bit depth and 16 million colors displayed by a desktop PC.

Monitor types can require different configuration of HMIs, thereby warranting selection of different most correct HMI rendering protocols. Monitors can be CRT (cathode ray tube), LCD (liquid crystal display), AMLCD (active matrix liquid crystal display), plasma, etc. Desktop PCs generally employ CRT monitors, which are brighter and have better screen resolutions than LCDs. Handheld PCs and cell phones typically utilize LCDs. Additionally, LCD viewing angle is less than that of a CRT display which may dictate a different protocol. Furthermore, varying aspect ratios (e.g., 4:3, 16:9, 16:10, . . . ) and display standards (e.g., Widescreen Ultra Extended Graphics Array (WUXGA), Ultra Extended Graphics Array (UXGA), Super Extended Graphics Array (SXGA), Extended Graphics Array (XGA), Super Video Graphics Array (SVGA), Video Graphics Array (VGA), Enhanced Graphics Adapter (EGA), CGA, Hercules, Monochrome Display Adapter (MDA), . . . ) are contemplated.

Cellular phones can require a different type of communications protocol. In particular, a Wireless Application Protocol (WAP) can be employed. WAP uses Wireless Markup Language (WML), which includes Handheld Device Markup Language (HDML). WAP can be utilized to accommodate for cell phone transfer speed, size and readability, and navigation. Cell phones and Web-enabled PDAs have a 14.4 kbps data transfer rate. Cell phones have small LCD screens (e.g., screen resolution of 150×150 pixels). Additionally, a wireless device can incorporate a monochrome screen. Additionally, navigation utilizing a cell phone requires use of scroll keys. Applying WAP, text only or low graphics versions of similar information typically displayed on a PC are created.

The HMI itself can be a fixed HMI, for example, such as a graphical interface on a stationary monitor used in conjunction with a personal and/or industrial computer. According to another example, the HMI can be a tethered portable HMI, such as the Machine Terminal MT750 or the Guard Terminal G750, both manufactured by Allen-Bradley. A tethered portable HMI offers several advantages over the fixed HMI; the most important being increased mobility to manually inspect the plant floor with the HMI in hand, thus permitting increased productivity. For example, an operator using a tethered portable HMI can respond to alarms and/or adjust machine settings with the HMI in hand. Increased mobility further enables greater troubleshooting capability and reduced set up time.

According to yet another example, the HMI can be a wireless HMI, wherein the term "wireless HMI" is meant to encompass any mobile computing device utilized in connection with wireless network communication (e.g., laptops, tablets, PDAs, . . . ). The wireless HMI offers even greater mobility than the tethered portable wireless, and its range can be extended by distributing additional based stations throughout a large plant. In this manner, an operator can access information regarding a given machine and control the machine from any point in the plant. Furthermore, several wireless computing devices can operate on a thin client platform, which permits facilitated integration to new or extant control architectures. By utilizing this technology, the wireless computing device can act as a thin client to computer applications. Because communication with a server occurs via a network link, this aspect of the present invention advantageously reduces hardware and software costs.

According to another example, the SEC 110 can incorporate a type of equipment being monitored as a parameter for determining a most proper HMI-rendering protocol. Typical industrial equipment can include, for example valves, pumps, relays, etc. An appropriate HMI is rendered dependent upon the type of equipment being monitored to provide users with meaningful graphical objects and useful controls.

A further example contemplates the proximity of the user 108 to the zone 104 in which a HMI is to be rendered (e.g. at what point or boundary the system 100 should begin to display information to the user 108). This aspect of the invention is advantageous in that it permits only relevant information to be displayed to the user 108 while less relevant information is suppressed. For example, the user 108 within the zone 104 can be provided a display of machinery which is only within the zone 104 where the SEC 110 is configuring the HMI. Additionally, this parameter is advantageous because it provides the user 108 with relevant information and reduces the likelihood of user confusion, which could exist if the user 108 was presented with all of the information within an industrial automation environment.

An additional example provides a hierarchy of users 108 within the zone 104. According to this aspect of the invention, HMI rendering will depend on rank of the user 108. This aspect is advantageous in that it creates different HMIs with different controls based on a rank or position of the user 108. This aspect provides for different controls and permissions dependent upon the user 108, which can be necessary in the industrial automation environment.

Another contemplated parameter is context of an operating environment. For example, this aspect of the present invention can yield a most correct protocol for HMI rendering dependent upon circumstances that are existent within the operating environment, such as power outages, and can provide notification (e.g., alarm, pop-up window, . . . ). Accordingly, this aspect is advantageous because the user 108 is provided with a meaningful HMI representing a situation warranting the user's attention. For example, if a pump malfunctions, a HMI can be rendered which alerts the user 108 regardless of the zone of operation 104, equipment being monitored, etc. due to urgency of a situation.

An additional aspect of the present invention utilizes network conditions to determine a most correct HMI rendering protocol. Examples of network conditions include wireless, Ethernet, etc. An advantage of incorporation of network conditions is illustrated by providing a wireless device with fewer control capabilities if wireless communications are found to be less secure than hardwired connections. Thus, to protect against unauthorized operation and/or control, HMIs utilizing wireless connections can be assigned fewer control capabilities.

A further considered aspect of the present invention is an incorporation of security when determining the most correct HMI rendering protocol. Security can be accommodated, for example, by preventing access to a set of equipment or controls dependent upon the location of a SEC 110, user 108, etc. Additionally, a security log can be included which would track events such as log in, location, actions performed, etc.

Security levels can also be implemented into the present invention. For example, dependent upon the user 108, zone 104, extrinsic data 106, etc., different sets of available actions and graphics can be rendered. More control and monitoring capabilities can be assigned corresponding to the security level.

According to another aspect of the current invention, authentication can be incorporated while selecting a most correct rendering protocol. Authentication assures information originates from a trusted source and can prevent rendering of a HMI if a user 108 attempts to render a HMI with a SEC 110 without proper authentication. Authentication can be implemented utilizing passwords, pass cards (e.g., magnetic strip cards, smart cards, . . . ), biometrics (e.g., fingerprint scan, retina scan, facial scan, voice identification, . . . ), digital signatures (e.g., utilizing the digital signature standard (DSS) format, . . . ), etc.

Another aspect of the present invention contemplates determination of a most correct HMI rendering protocol in part based upon priorities associated with various potential user actions. For example, a priority can be assigned to each action based on the importance of the action. As a further illustration, if user control of a pump has a greater importance than user control of a valve, the pump can be assigned a higher priority. Thus, when a HMI is rendered to the user 108, information related to the pump will be displayed instead of information related to the valve. The system 100 contains a SEC 110 and industrial automation environment parameters 102. SEC 110 regulates operation of software. SEC 110 creates and manages a sequence of operations which facilitate HMI configuration. For example, according to one aspect of the present invention, a SEC 110 queries an industrial automation environment, gathers pertinent current parameters, and renders a HMI based upon an interrelation between the identified parameters and a predefined protocol.

The SEC 110 can utilize parallel, symbolic or sequential execution. According to one aspect of the current invention, parallel execution can be implemented. For example, first a controller decides which actions to do in parallel, then which processors to utilize for executing each action, then deciding a sequence in which the processor will execute work assigned to it, and finally, expressing these decisions in a machine dependent manner.

Another aspect contemplates the use of symbolic execution by a SEC 110. Accordingly, symbolic values are used instead of actual data as an input value. Symbolic execution relates to aliasing of data, wherein a software object is assigned a symbolic address to serve as a placeholder (symbol) until an address is known at a later time. After creation of all the software objects, attributes can be assigned to the object to specify a certain characteristic. For example, specific process points which the software communicates with can subsequently be added while creating software objects to utilize in numerous HMIs.

Therefore, the symbol can be specified at a later time and provide for design of a HMI independent of design of the remainder of the control architecture. Thus, this aspect of the current invention enables a more efficient design scheme that allows two interrelated configurations to be accomplished independent of one another and further to merge the designs at a time optimum to the overall design.

Figure 2:
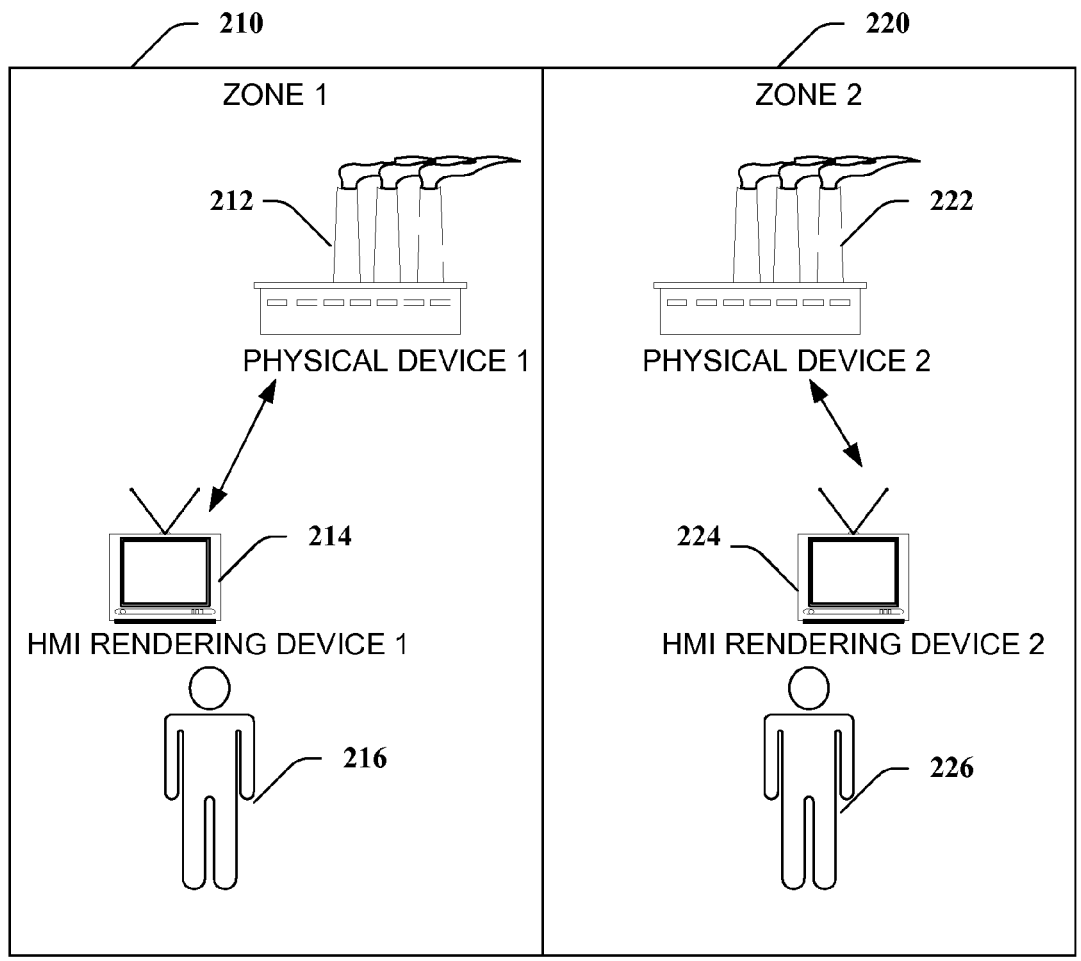
FIG. 2 is an illustration of an exemplary model of an aspect of the present invention.

FIG. 2 is an illustration of an exemplary aspect of the present invention. For example, a most correct HMI rendering protocol can be determined based on a zone where a HMI rendering is occurring. If a user is in zone 1 (210) with HMI rendering device 1 (214), a rendered HMI can provide graphical representations and/or controls of physical device 1 (212) and exclude display and/or controls of physical device 2 (222). Furthermore, the same user in zone 2 (220) with HMI rendering device 2 (224) can be provided with only a graphical representation and/or controls of physical device 2 (222). Additionally, if a user 216 and a user 226 are different people, disparate security levels can be assigned such that a HMI with graphical representation and/or controls of both physical device 1 (212) and physical device 2 (222) can be rendered for user 216, whereas only physical device 2 is rendered for user 226, or vice versa. It is to be appreciated that FIG. 2 is representative of an example of this aspect of the present invention and the invention should not be limited to this example, and that the present invention contemplates and embraces a system wherein the aforementioned factors can be incorporated into determination of a most correct HMI rendering protocol.

Figure 3:
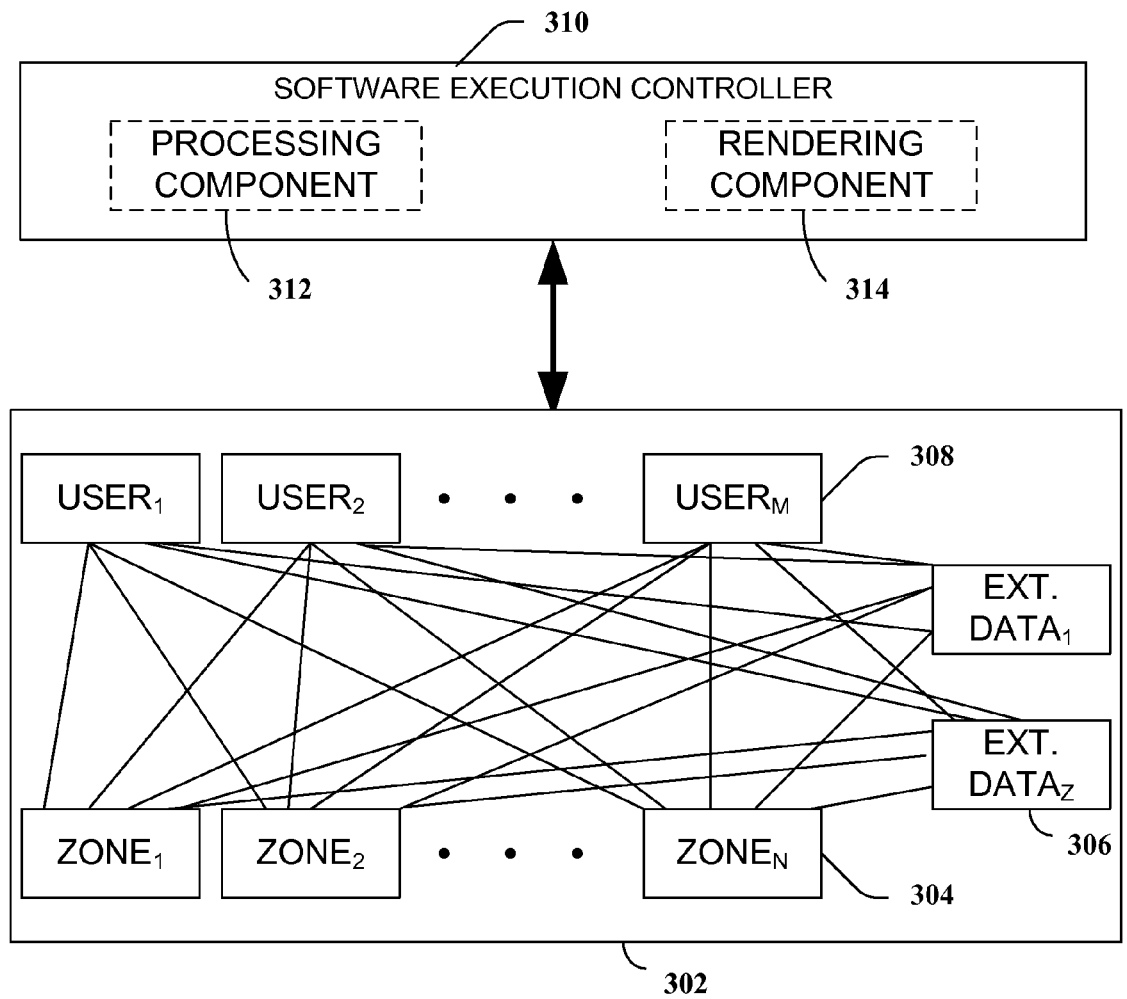
FIG. 3 is an illustration of a block diagram for location-based execution of software/HMI that incorporates a processing component and a rendering component in accordance with an aspect of the present invention.

FIG. 3 is an illustration of a system 300 according to an aspect of the present invention in which the software execution controller (SEC) 310 is comprised of a processing component 312 and a rendering component 314. The processing component 312 queries an industrial automation environment and determines a current state of parameters 302 such as zone 304, extrinsic data 306, and user 308. The rendering component 314 utilizes the parameters 302 obtained by the processing component 312 to determine a most correct HMI rendering protocol. Based upon the interrelation of the parameters and the HMI rendering protocols, the rendering component 314 creates a HMI for the user 308.

Figure 4:
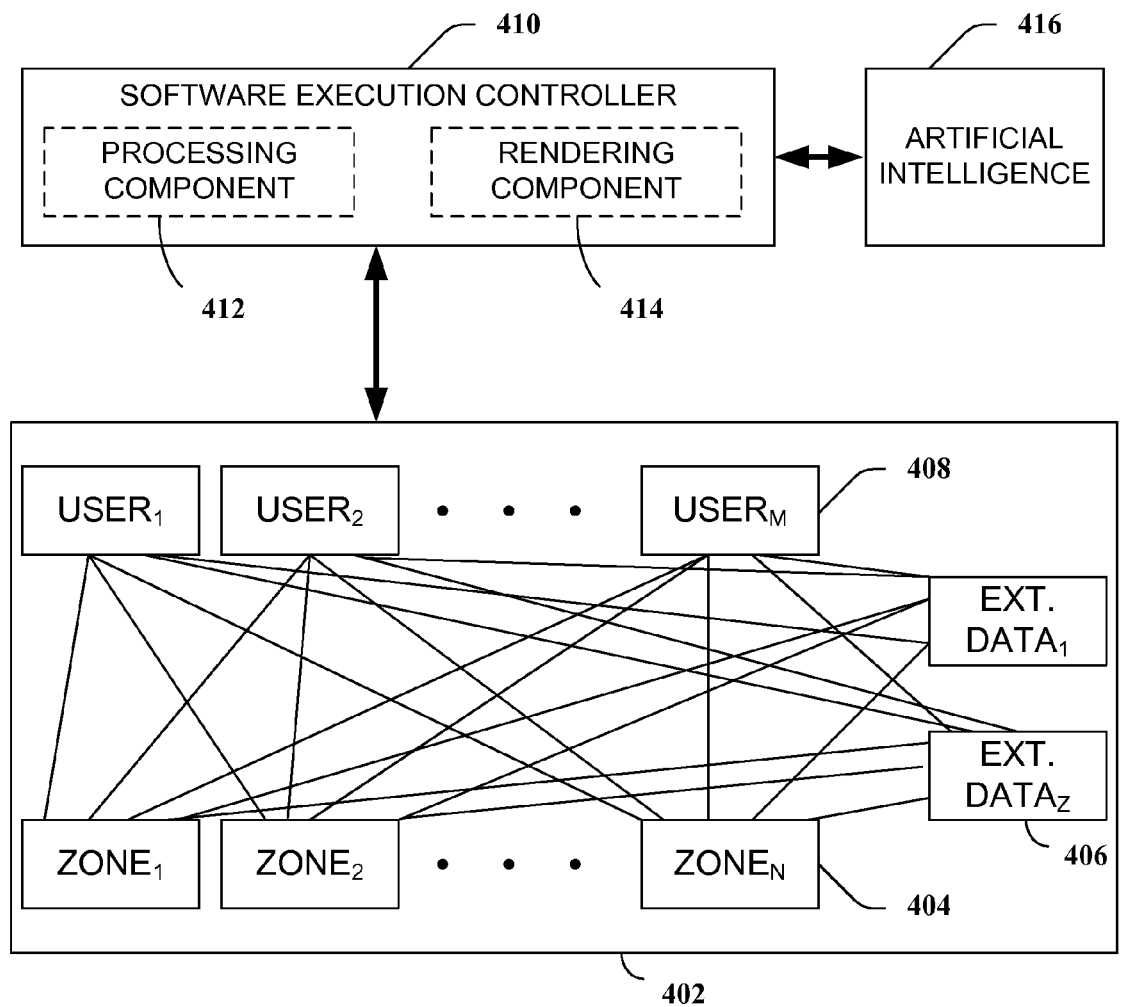
FIG. 4 is an illustration of a block diagram for location-based execution of software/HMI that incorporates artificial intelligence in accordance with an aspect of the present invention.

FIG. 4 is an illustration of a system 400 in accordance with an aspect of the present invention. The system 400 can employ various inference schemes and/or techniques in determining the most correct HMI rendering protocol. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

The system 400 comprises a SEC 410 with a processing component 412 and a rendering component 414. The SEC 410 is operably coupled with an artificial intelligence (A/I) component 416. It is to be understood that the A/I component 416 of the present invention can be associated with the processing component 412, the rendering component 414, the SEC 410, or any combination thereof. The A/I 416 is capable of determining which type of HMI to render given a cost of rendering an incorrect HMI. Such determination can be based on, for example, costs of providing a user with incorrect amount of control (e.g., whether a particular user is capable of controlling too many or too few operations employing a rendered HMI), graphically representing information which does not actually exist in an industrial automation environment, etc.

Figure 5:
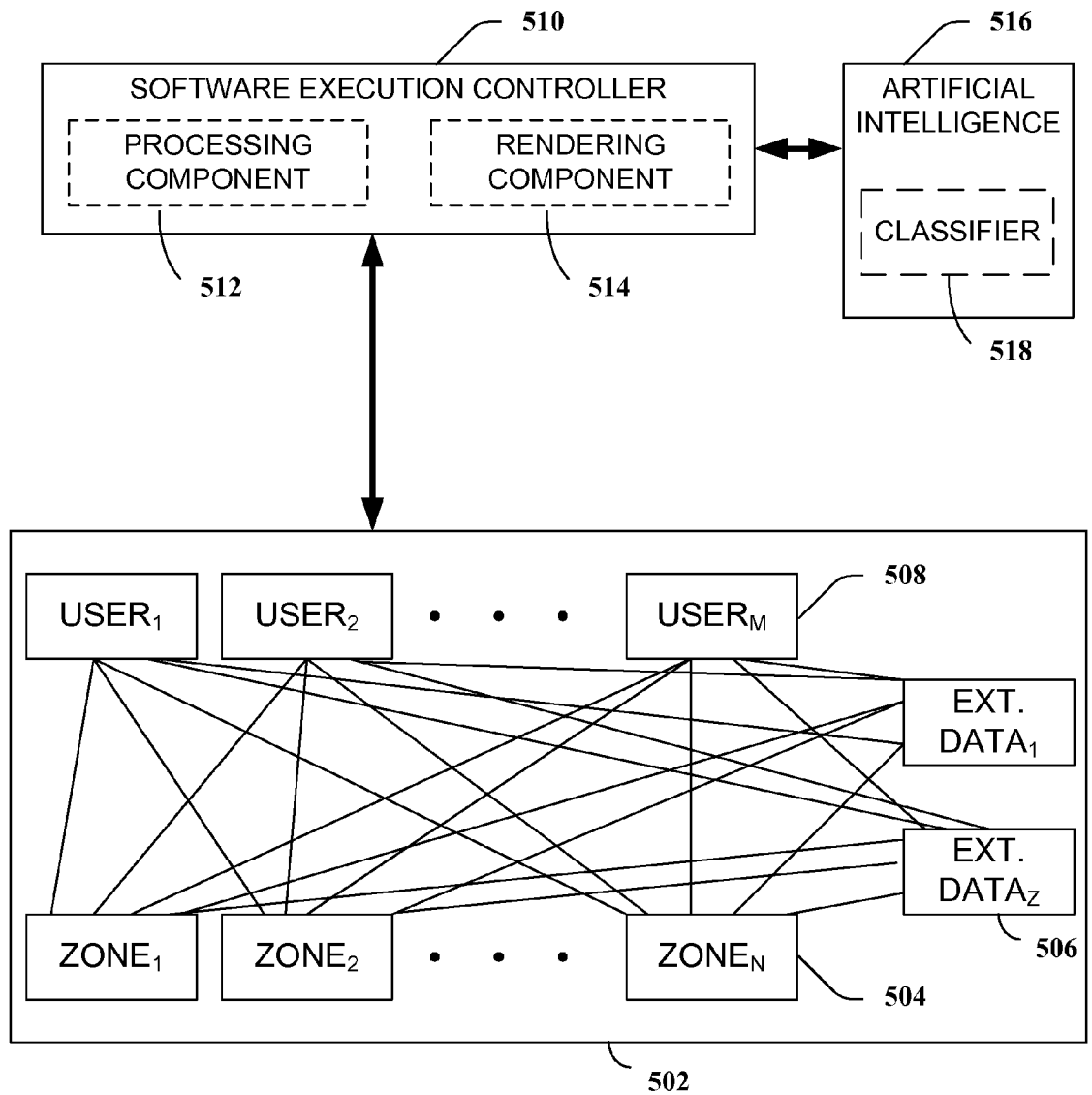
FIG. 5 is an illustration of a block diagram for location-based execution of software/HMI that incorporates a classifier in accordance with an aspect of the present invention.

FIG. 5 illustrates a system 500 where the artificial intelligence (A/I) component 516 comprises a classifier 518. The classifier 518 can be employed to determine a correct HMI to render. The classifier 518 can be trained, for example, either explicitly or implicitly. Explicit training of a classifier can require the user 508 and/or programmer to input correctly rendered HMIs based on industrial automation environment parameters. Implicit training of a classifier can be achieved by monitoring correctly rendered HMIs based on industrial automation environment parameters. Thus, as HMIs are rendered, the classifier 518 is continuously training based on correct renderings. According to one aspect of the present invention, the classifier 518 can be operably coupled to a SEC. The rendering component 514 of the SEC can utilize the classifier, rendering a correct HMI based on the industrial automation parameters obtained by the processing component 512 and then employing the classifier 518 to select the most correct HMI rendering protocol.

Figure 6:
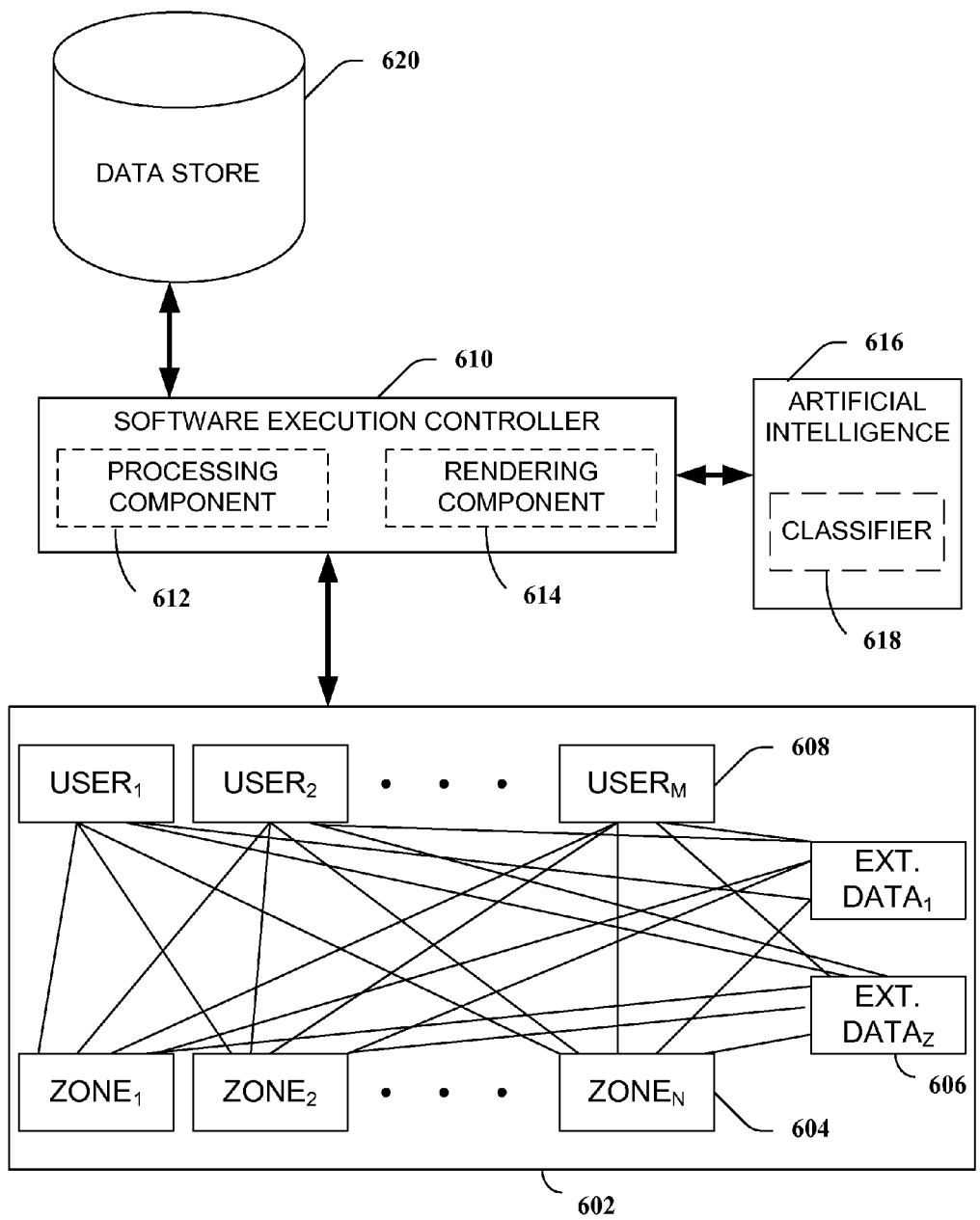
FIG. 6 is an illustration of a block diagram for location-based execution of software/HMI that incorporates a data store in accordance with an aspect of the present invention.

FIG. 6 is an illustration of a system 600 that incorporates a data store component 620 according to an aspect of the present invention. The data store can be operably coupled to the SEC 610, the processing component 612 and/or the rendering component 614 of the SEC 610. For example, if the data store 620 is incorporated with a processing component 612 of the SEC, the data store 620 can provide parameters and/or parameter interrogation queries to the processing component 612. Such parameters and/or parameter interrogation queries can include, for example, security, security level, users, zones, etc. Additionally, the data store 620 can be associated with the rendering component 614. The data store 620 can thereby store protocols, rendered HMIs, parameters utilized, etc. transferred from the rendering component 614.

The data store 620 can facilitate storage of parameters and parameter interrogation queries. For example, the application and parameter data store can be computer readable media including, but not limited to, an ASIC (application specific integrated circuit), CD (compact disk), DVD (digital video disk), ROM (read only memory), floppy disk, hard disk, EEPROM (electrically erasable programmable read only memory) and memory stick in accordance with the present invention. The data store 620 can optimize efficiency within the rendering of HMIs within the industrial automation environment.

Figure 7:
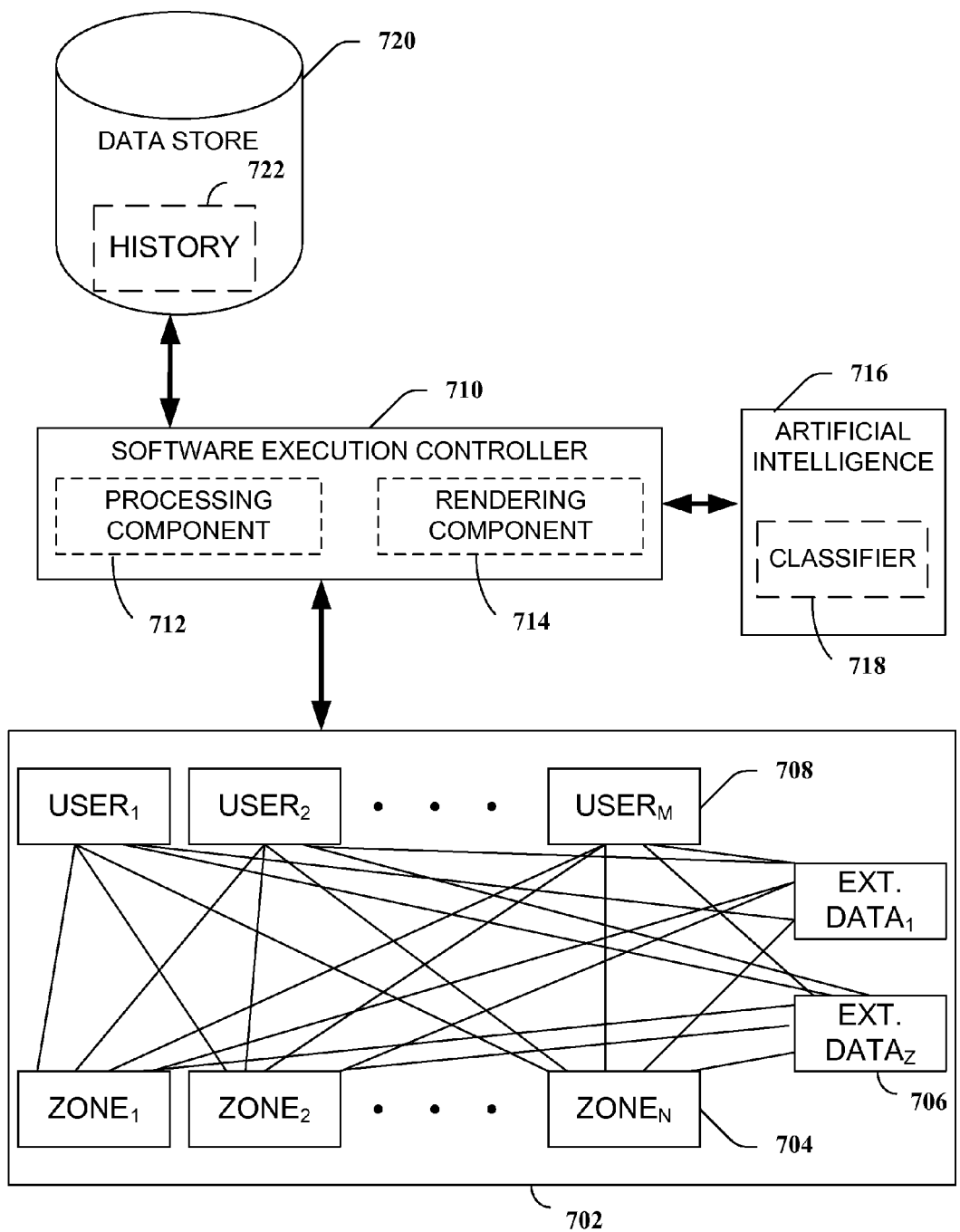
FIG. 7 is an illustration of a block diagram for location-based execution of software/HMI that incorporates a history component in accordance with an aspect of the present invention.

FIG. 7 is an illustration of a block diagram of a system 700 according to an aspect of the present invention, wherein the data store 720 comprises a history component 722. This aspect of the invention contemplates associating the history component 722 with a SEC 710, processing component 712, and/or rendering component 714. For example, if the history component 722 is operably coupled to the processing component 712 then the processing component can query the history component 722 for parameters previously obtained from the industrial automation environment. Additionally, according to another example, operably coupling the history component 722 to the rendering component 714 can increase speed of a rendering process or reduce a number of errors rendering incorrect HMIs. This advantage is accomplished by storing correct HMIs for a given set of parameters and thus, a rendering component 714 can utilize a history component 722 once provided with industrial automation environment parameters from a processing component.

The SEC 710, processing component 712, and/or rendering component 714 can communicate with the history component 722 via, for example, a parallel electrical connection, a serial electrical connection, a computer network connection (e.g., utilizing the Internet), a Digital Subscriber Line (DSL), a telephone line, a cable modem, a wireless data communications link and/or integrated services digital network (ISDN).

Turning briefly to FIGS. 8, 9, 10, and 11, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

Figure 8:
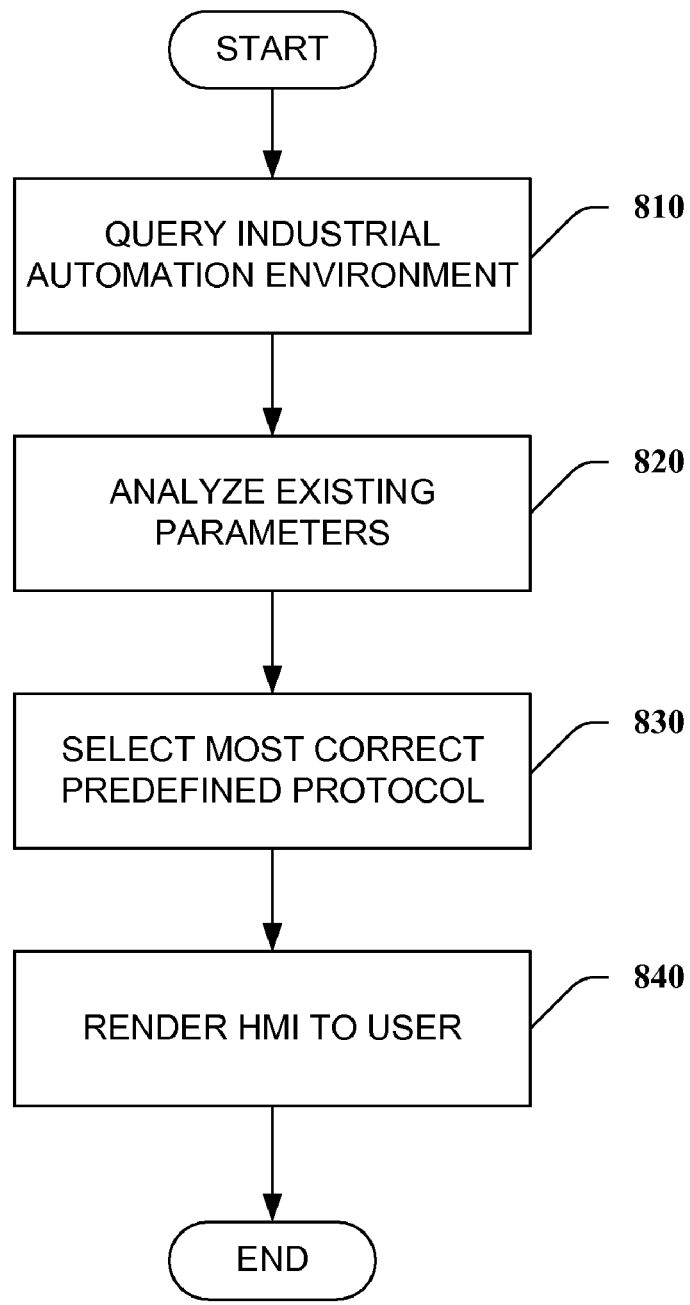
FIG. 8 is an illustration of a flow diagram of a methodology for location-based execution of software/HMI in accordance with an aspect of the present invention.

FIG. 8 is an illustration of a methodology 800 in accordance with an aspect of the present invention. According to this methodology, an industrial automation environment is queried at 810. Artificial intelligence can be employed to query the industrial automation environment. According to another aspect of the present invention, a processor can be utilized to query the industrial automation environment. At 820, existing parameters which are obtained from the industrial automation environment are analyzed. The parameters can include, for example, zone of operation, user, extrinsic data, type of equipment being employed, equipment being monitored, user proximity to the zone, hierarchy of users within the zone, context of the operating environment, network conditions, security, security levels, authentication, priorities associated with various potential user actions, etc. Upon analyzing the existing parameters, a most correct predefined protocol can be selected at 830. At 840, the most correct predefined protocol can then be utilized to render a HMI to the user.

Figure 9:
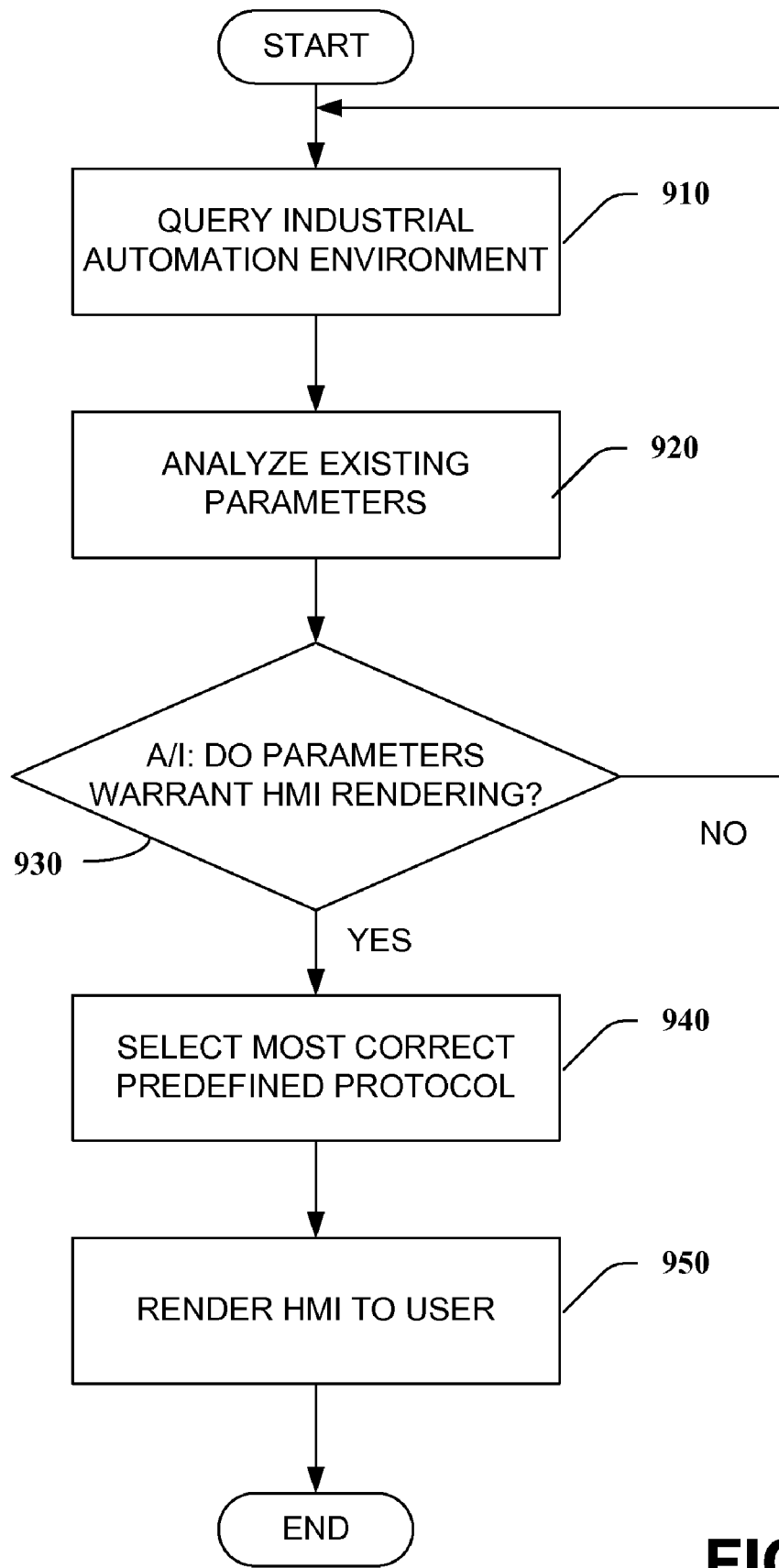
FIG. 9 is an illustration of a flow diagram of a methodology for location-based execution of software/HMI in accordance with an aspect of the present invention.

FIG. 9 is an illustration of a methodology 900 in accordance with an aspect of the present invention. An industrial automation environment is queried at 910. At 920, existing parameters received from the industrial automation environment are analyzed. A/I can be employed to determine whether the parameters warrant rendering of a HMI at 930. A/I can be incorporated to reduce a potential number of incorrect HMIs rendered. If the parameters can be utilized to render a correct HMI, then a most correct predefined protocol is selected at 940. At 950, the HMI is rendered to the user. Alternatively at 930, if the parameters are analyzed and they do not warrant HMI rendering, then the industrial automation environment is queried again at 910.

Figure 10:
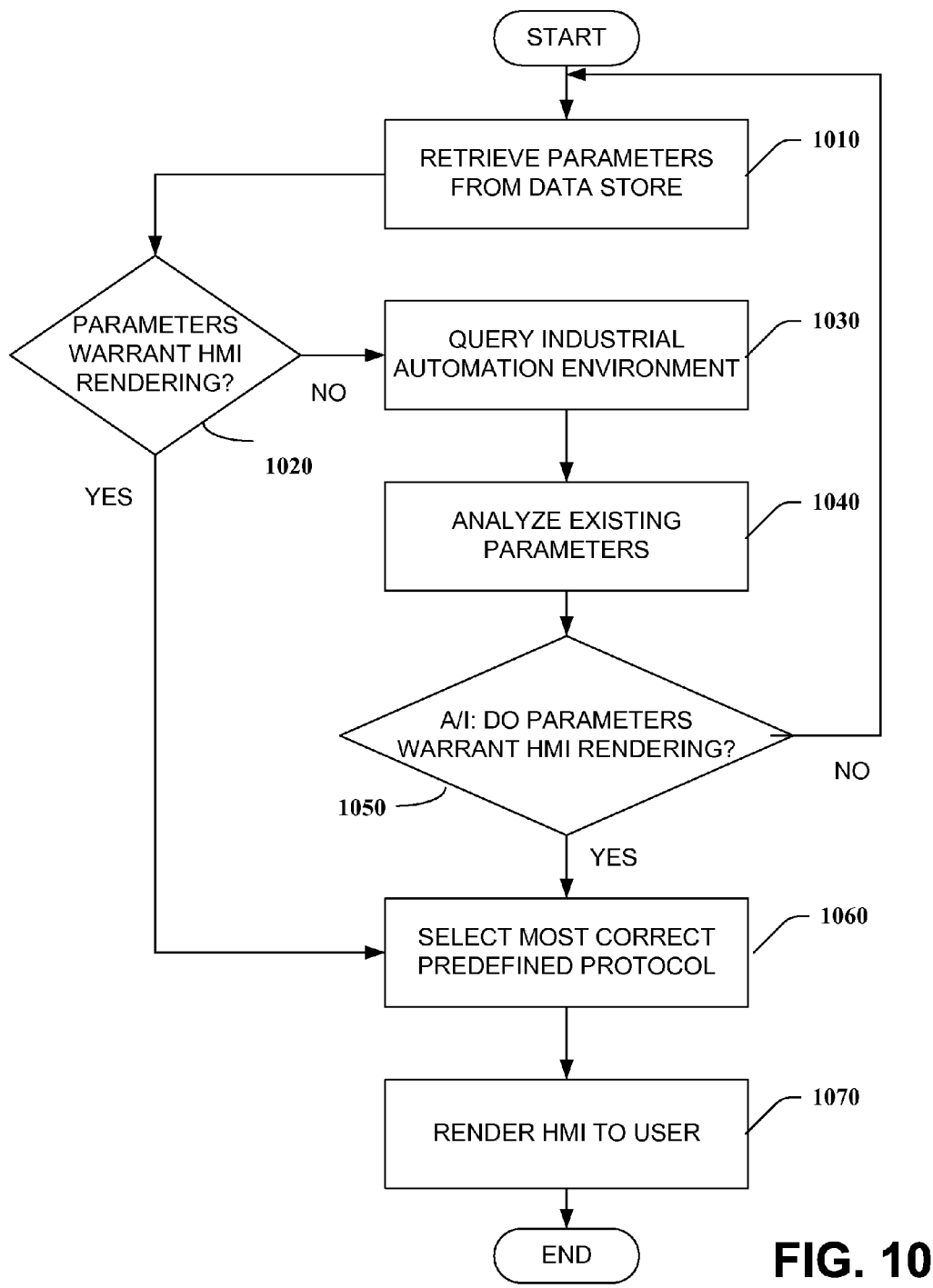
FIG. 10 is an illustration of a flow diagram of a methodology for location-based execution of software/HMI in accordance with an aspect of the present invention.

FIG. 10 is an illustration of a methodology 1000 in accordance with an aspect of the present invention. At 1010, parameters and/or parameter interrogation queries are retrieved from a data store. At 1020, a determination whether the parameters warrant HMI rendering is made. The determination can be, but is not limited to, user selected, inferred by artificial intelligence, classifier determined (e.g., classifier can be trained explicitly and/or implicitly), and/or a function of a data store. If the parameters warrant rendering, then a most correct predefined HMI protocol can be selected at 1060 and a HMI is rendered to the user at 1070. If the parameters do not warrant HMI rendering at 1020, then the industrial automation environment is queried at 1030. Next, the existing parameters are analyzed at 1040. At 1050, a determination is made as to whether the parameters warrant HMI rendering. If the parameters warrant HMI rendering, then a most correct predefined HMI protocol is selected at 1060 and a HMI is rendered to the user at 1070. If the parameters do not warrant HMI rendering at 1050, then parameters can be retrieved from a data store again at 1010.

Figure 11:
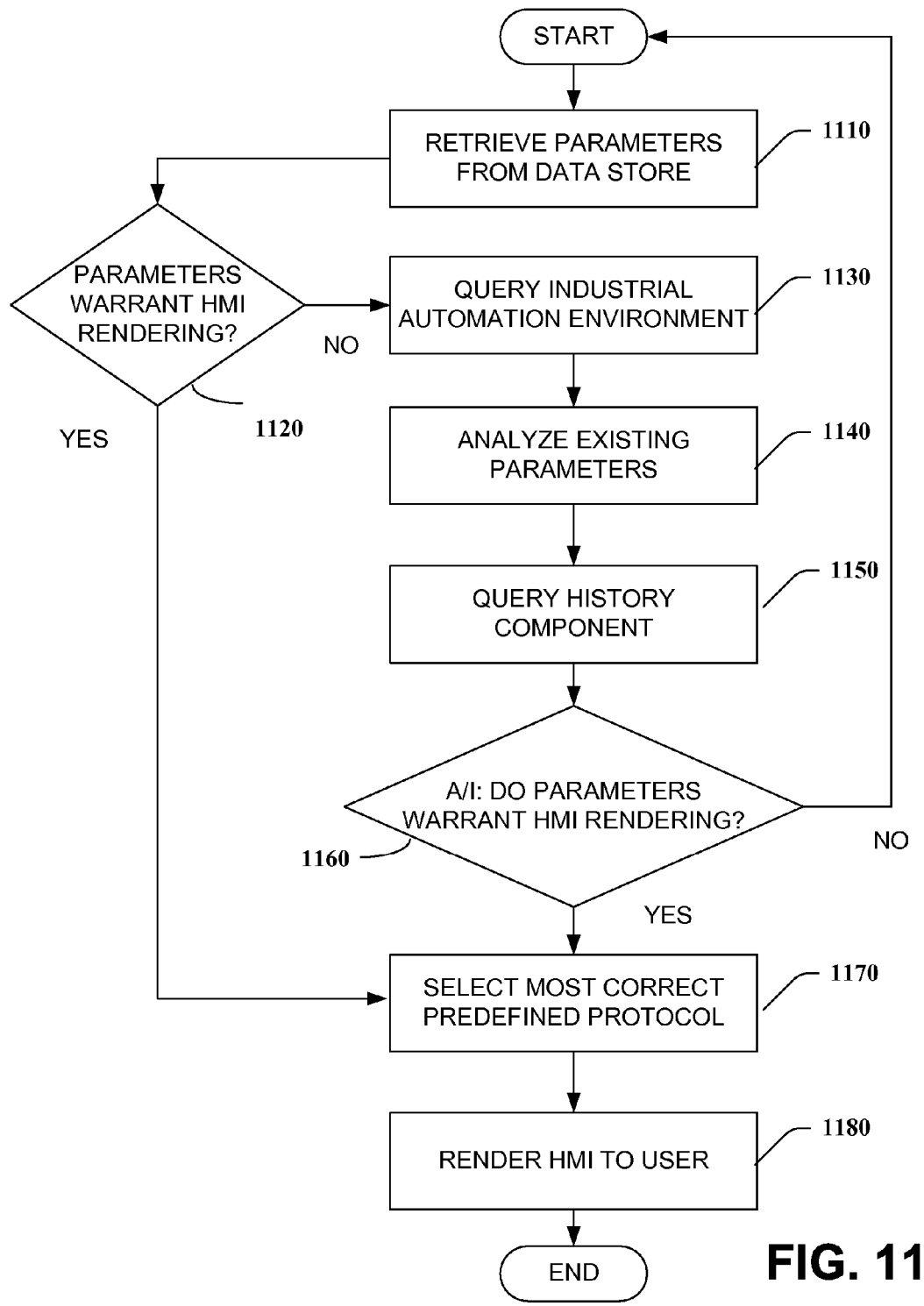
FIG. 11 is an illustration of a flow diagram of a methodology for location-based execution of software/HMI in accordance with an aspect of the present invention.

FIG. 11 is an illustration of a methodology 1100 in accordance with an aspect of the present invention. At 1110, parameters and/or parameter interrogation queries are retrieved from a data store. A determination is made at 1120 whether the retrieved parameters warrant HMI rendering. The determination can be, but is not limited to being, user selected, inferred via artificial intelligence, classifier determined (e.g., classifier can be trained explicitly and/or implicitly), and/or a function of a data store. If the parameters warrant rendering, then a most correct predefined HMI protocol can be selected at 1170 and a HMI is rendered to a user at 1180. If the parameters do not warrant HMI rendering at 1120, then an industrial automation environment is queried at 1130. Next, the existing parameters are analyzed at 1140. At 1150, a history component is queried to examine whether parameters, correct HMI renderings, protocols, etc. can be provided. At 1160, a determination is made as to whether the parameters warrant HMI rendering. If the parameters warrant HMI rendering, then a most correct predefined HMI protocol is selected at 1170 and a HMI is rendered to the user at 1180. If the parameters do not warrant HMI rendering at 1160, then parameters can be retrieved from a data store again at 1110.

Figure 12:
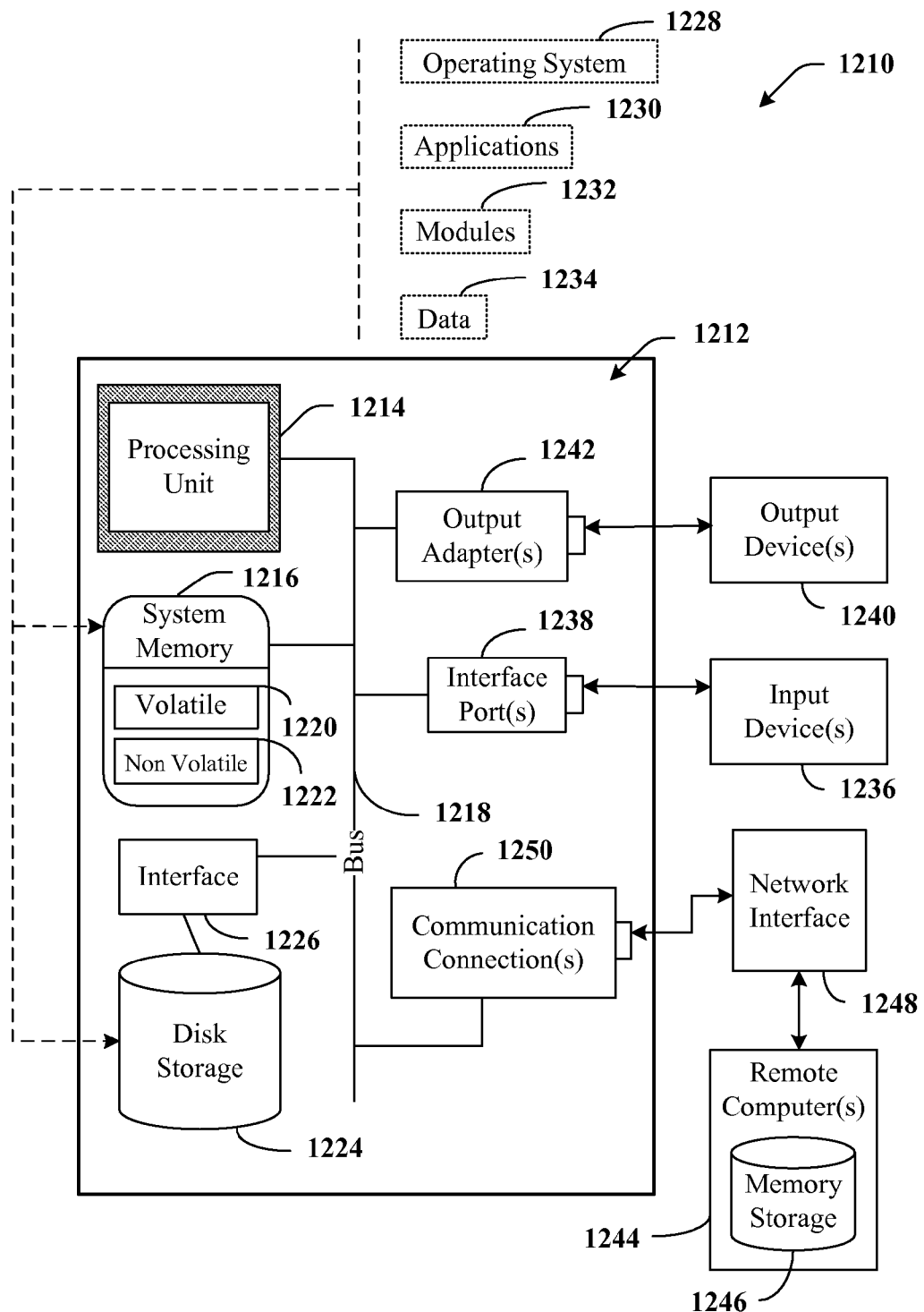
FIG. 12 is an illustration of an exemplary computing system and/or environment in connection with facilitating employment of the subject invention.
Figure 13:
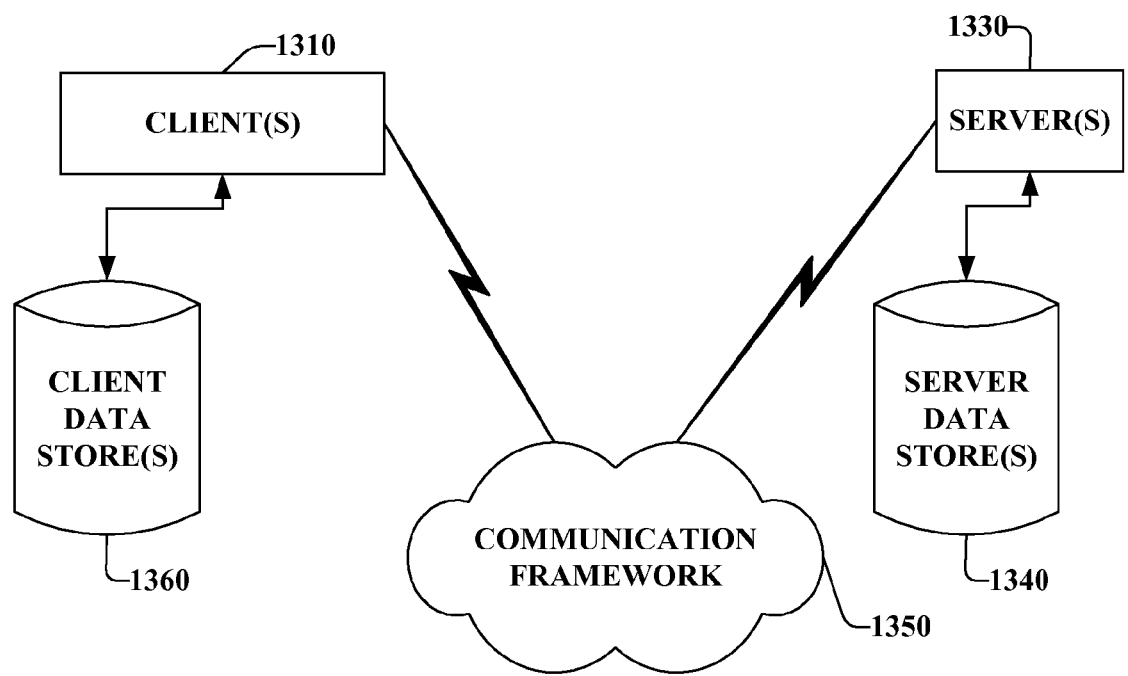
FIG. 13 is an illustration of an exemplary computing system and/or environment in connection with facilitating employment of the subject invention.

In order to provide a context for the various aspects of the invention, FIGS. 12 and 13 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multi-processor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample-computing environment 1300 with which the present invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the present invention, for example. One possible communication between a client 1310 and a server 1330 may be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A human machine interface (HMI) system that renders a HMI based on an industrial automation environment comprising:
    a software execution controller (SEC) that identifies one or more extant parameters of an industrial automation environment and renders a HMI to a user employing a HMI rendering protocol selected based at least on the identified extant parameters.

2. The system of claim 1, the SEC farther comprises a processing component that queries the industrial automation environment to identify the one or more extant parameters.

3. The system of claim 2, the SEC farther comprises a rendering component that renders the HMI by selecting the HMI rendering protocol based at least on the extant parameters obtained by the processing component.

4. The system of claim 3, the SEC is operably coupled to an artificial intelligence component capable of determining a type of HMI to render given a cost of rendering an incorrect HMI.

5. The system of claim 4, the artificial intelligence component further comprises a classifier utilized by the rendering component to select the HMI rendering protocol.

6. The system of claim 5, the classifier is continuously trained based on correct renderings of HMI.

7. The system of claim 3, a data store operably connected to one or more of the processing component or the rendering component of the SEC.

8. The system of claim 7, wherein the data store is connected to the processing component and stores one or more of parameters or parameter interrogation queries.

9. The system of claim 7, the data store is connected to the rendering component to store protocols, rendered HMIs and parameters utilized for the rendered HMIs.

10. The system of claim 7, the data store comprises a history component wherein the history component stores parameters previously obtained from the industrial environment when coupled to the processing component and the history component records correct HMIs rendered for a given set of parameters when coupled to the rendering component.

11. The system of claim 1, the SEC implements at least one of parallel, symbolic or sequential execution.

12. The system of claim 1, the one or more extant parameters relate to one or more of zone of operation, user identity, security, context of an operating environment, network conditions, or priorities associated with one or more potential user actions.

13. A computer implemented method for rendering a HMI based on an industrial environment comprising:
    interrogating an industrial environment to gather one or more of its pertinent current parameters;
    analyzing the gathered parameters;
    determining a predefined protocol based at least upon the analysis;
    rendering a HMI to a user based at least upon an interrelation between the parameters and the predefined protocol.

14. The method of claim 13, further comprising employing artificial intelligence to determine if the parameters warrant a rendering of a HMI.

15. The method of claim 13, further comprising implementing symbolic execution of instructions within the industrial environment wherein one or more symbolic values are used instead of actual data as one or more input values.

16. The method of claim 15, the one or more symbolic values relate to at least a symbolic address for one or more software objects, the at least one symbolic address serves as a placeholder until an address for the one or more software objects is determined.

17. The method of claim 15, the rendered HMI is produced by merging at least two designs of interrelated configurations, the designs are developed independent of one another and merged at a time optimum to an overall design.

18. A computer executable system for rendering HMIs comprising:
    means for identifying one or more pertinent current parameters of an industrial automation environment; and
    means for rendering a HMI to a user based on an interrelation between the identified parameters and a selected HMI rendering protocol.

19. The system of claim 18, the identified parameters include one or more of: zone of operation proximate to the user, user identity, hierarchy of the user within the zone, security level, a device rendering the HMI, network connections, type of equipment monitored by the HMI, context of an operating environment, or priorities associated with potential user actions.

20. The system of claim 18, further comprising means for storing coupled to the means for identifying and the means for rendering, the means for storing facilitates retrieving one or more of parameters, parameter interrogation queries or HMIs rendered correctly for a given set of parameters.

* * * * *